March 31, 1936.    T. BRIEGEL    2,035,686
TOOL FOR FORMING JOINTS IN TUBING
Filed Sept. 4, 1934
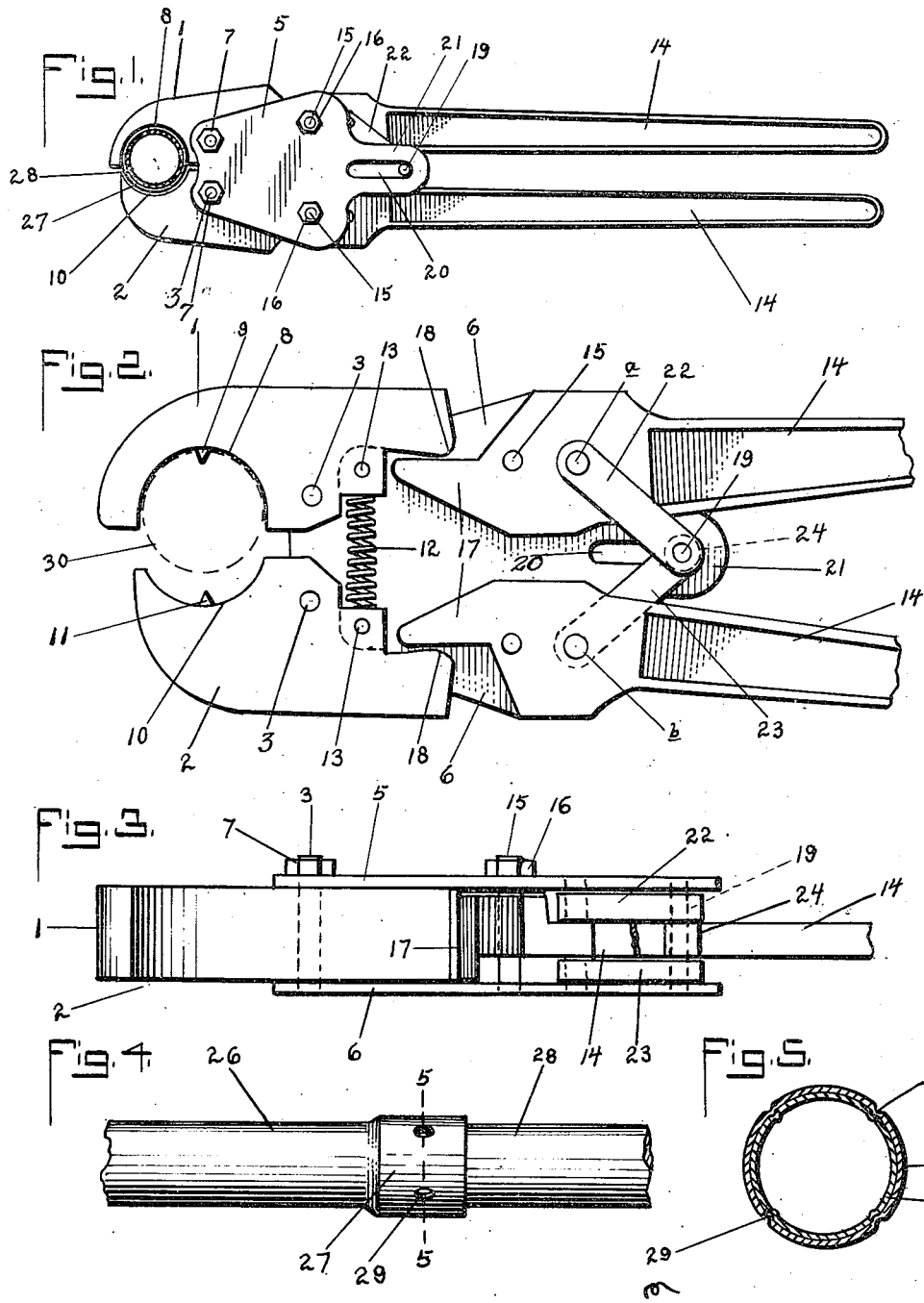
INVENTOR
Theodore Briegel.
BY Walter N. Haskell,
his ATTORNEY Patented Mar. 31, 1936

2,035,686

UNITED STATES PATENT OFFICE 2,035,686

TOOL FOR FORMING JOINTS IN TUBING

Theodore Briegel, Moline, Ill.

Application September 4, 1934, Serial No. 742,628

1 Claim. (Cl. 153—2)

My invention has reference to a tool for compressing and indenting thin metal tubing, and is designed for use in connection with a method for forming joints in metal tubing, for which I made application for Letters Patent of the United States under date of July 17, 1933, Serial No. 680,821, Patent No 1,998,664, dated April 23, 1935. By the method set forth in said application, and by the use of the tool described herein in connection therewith, a joint can be formed between two sections of tubing, or between couplings or connectors and the ends of tube sections, which will resist a maximum amount of strain placed thereon, tending to separate the same. Joints thus formed, designed for use in connection with electric wiring and similar uses, have successfully passed severe tests made by the United States Board of Insurance Underwriters.

The method set forth is stated to be for use with sections of tubing of the same diameter, the first step of which consists of expanding the end of one section so that it will fit snugly on the end of another section. When thus arranged, the ends of the sections are joined, and the tool made use of in causing the overlapping ends to be frictionally engaged with each other, and at the same time provided with indentations in the outer lap, which project into the inner tube, and rigidly unite said ends. The tool can also be used for uniting sections of tubing with relatively short pieces of tubing forming couplings and connectors, of slightly larger diameter than the tubing.

The present invention is designed for operation by hand, and is in the form of a large pliers, with special leverage mechanism by means of which the power applied to the handles is greatly multiplied in the operating end of the tool.

In the drawing:—

Fig. 1 is a plan view of the invention, with the jaws closed.

Fig. 2 is an enlarged view of the head of the tool, with the plate 5 removed.

Fig. 3 is an edge view thereof.

Fig. 4 shows a joint between two pieces of tubing, formed by means of the tool.

Fig. 5 is a cross-section, on the broken line 5—5 of Fig. 4.

The tool comprises a pair of jaws 1 and 2, pivoted on bolts 3 in a pair of parallel spaced plates 5 and 6, and provided on one of their ends with nuts 7. The jaw 1 is provided in its inner edge with a recess 8, of semicircular form, in the inner wall of which is fixed a prong 9. The jaw 2 has a recess 10 of shallower depth than that of the recess 8, and adapted to cooperate with the recess 8 in grasping and compressing a piece of tubing. The recess 10 is also provided with a prong 11, acting in opposition to the prong 9. The recess 8 is of a shape greater than a semicircle, the extended walls thereof providing a support for the side walls of a piece of tubing engaged by said jaws, and preventing a lateral spread and distortion of the tubing before the jaws are fully closed.

The jaws are held normally in open position by means of the pull of a coiled spring 12 connected at its ends with pins 13 passing through recesses in the inner extensions of said jaws. The tool is also fitted with a pair of handles 14, fulcrumed on bolts 15 held in the plates 5 and 6, and provided on their threaded ends with nuts 16. At the inner ends of said handles are extensions 17 the ends of which are in contact with bearing-faces 18 on the inner ends of the jaws 1 and 2. By moving the handles toward each other the inner ends of the jaws are forced outwardly, causing the jaws to tightly grasp a piece of tubing which is positioned between them. When two overlapping sections are thus engaged the exertion of additional force on the handles will result in a compression of the outer tubing, causing a frictional engagement thereof with the inner piece. At the same time the prongs 9 and 11 will deeply indent the outer tube, the distortion of such tube being carried into the inner tube, and locking said tubes against separation.

The action of the handles 14 is guided and balanced by means of a pin 19, the ends of which are slidable in slots 20 in extensions 21 on the plates 5 and 6. Pivoted on said pin near the ends thereof is a pair of arms 22 and 23, the other ends of which have pivotal connections with the handles 14, as at $a$ and $b$. By this means the handles are held in proper relation with each other, and the action of the jaws is uniform. The arms 22 and 23 are separated on the pin 19 by a spacer 24, in which the pin is fixed, and which spacer also limits the movement of the handles toward each other.

In Figs. 4 and 5 is shown a joint between two sections of tubing, one section 26 having an enlargement 27, in which is held the end of a section 28 of similar diameter with the section 26. In the enlargement 27 are indents 29 formed by the tool hereinbefore set forth. In practice it has been found best to provide the joint with a double pair of indentations, equally spaced, as shown in said figures, this being accomplished by forming one of said pairs, then releasing the jaws and giving a quarter-turn to the tubing, followed by the forming of the other pair of indents. The forming of said indents results in slight irregularities on the inner wall of the inner tube, but not of a nature to be detrimental to the use thereof, in drawing wires through the tubing. This has also been tested and determined by the Board of Underwriters.

A large per cent of the tubing of the type described is of a standard size, and the tool is made with jaws of a capacity to correspond therewith, but variations can be had in the size of the jaws for use with tubing of other diameters.

By the use of the tool set forth herein it is possible to join pieces of tubing on the job, and with a great saving of time and labor where such tubing can be used in place of the heavier kind of pipes now usually employed. The ends of the bolts 3 and 15 are preferably held in the plate 6 so as not to project beyond the outer face thereof, as by welding, making it possible to operate the tool in close proximity to an object, such as a switch box or other housing of an electrical system.

In order that the tool may operate effectively it is necessary to use the same with relatively thin tubing of the kind set forth herein, as the usual type of pipes and conduits are of such heavy material that it is impossible to indent them except by the use of a punch or other heavy tool.

What I claim, and desire to secure by Letters Patent, is:

In a tool of the class described, a housing, a pair of handles pivoted in said housing, a pair of jaws pivoted in said housing, provided with cooperating recesses for a clamping engagement with a piece of thin wall tubing, one of said recesses being greater than a semicircle, and the other recess correspondingly less than a semicircle, means for imparting the movement of said handles to said jaws to cause the closing thereof with compressive force, and means in said recesses for coincidentally distorting the wall of said tubing to engage the same with another piece of tubing overlapped thereby.

THEODORE BRIEGEL.